Aug. 25, 1970  W. CLAAS ET AL  3,525,203

GUARD FINGER FOR A MOWING APPARATUS

Filed Dec. 12, 1967  2 Sheets-Sheet 1

Inventor:
Walter Claas
Manfred Hägner
By Michael S. Striker
Attorney

Aug. 25, 1970  W. CLAAS ET AL  3,525,203
GUARD FINGER FOR A MOWING APPARATUS
Filed Dec. 12, 1967  2 Sheets-Sheet 2
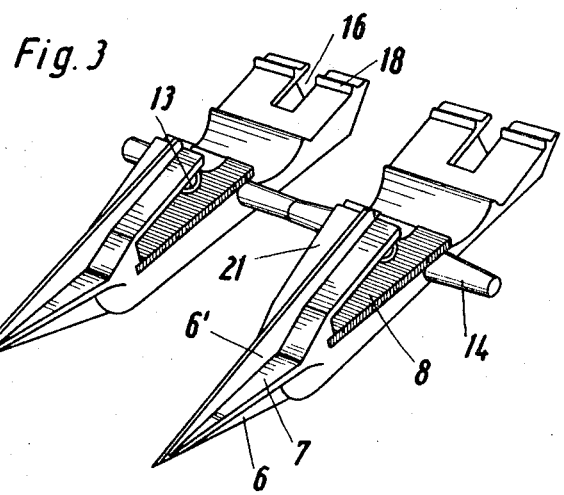
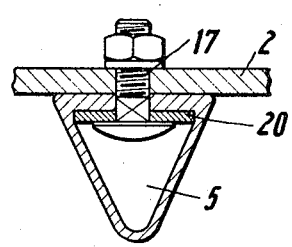
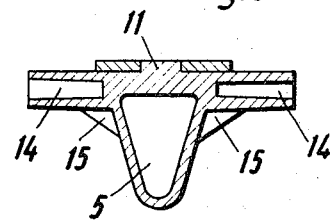
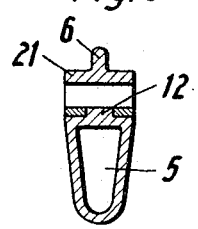
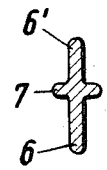

United States Patent Office 3,525,203
Patented Aug. 25, 1970

3,525,203
GUARD FINGER FOR A MOWING APPARATUS
Walter Claas, Harsewinkel, and Manfred Häfner, Leopoldshohe, Germany, assignors to Gebr. Claas, Harsewinkel, Westphalia, Germany
Filed Dec. 12, 1967, Ser. No. 690,027
Claims priority, application Germany, Dec. 12, 1966, C 40,957
Int. Cl. A01d 55/10
U.S. Cl. 56—311                                   12 Claims

ABSTRACT OF THE DISCLOSURE

A guard finger for a moving apparatus such as a harvester combine or the like, in which the finger is made from plastic material and in which the rear portion of the finger, which carries a blade, is in the form of a hollow, bending and torsion resistant profile provided with engaging means for properly positioning the blade thereon, and in which the front portion of the finger has a substantially cross-shaped configuration tapering substantially to a point at the front end of the finger.

BACKGROUND OF THE INVENTION

Mowing apparatus for harvester combines or the like are known which have a reciprocating cutting knife and are provided with a plurality of guard fingers removably carried on a carrier bar spaced in transverse direction from each other and projecting forwardly from the carrier bar and each carrying a blade which cooperates with the oscillating cutter for cutting stalks which are guided by the guard fingers toward the reciprocating cutter. The present invention relates to such guard fingers.

The guard fingers which are presently used in mowing apparatus of the above mentioned type are forged from steel and have therefore considerable weight and are expensive to manufacture. They are also subjected to rust during use, are difficult to attach and liable to break relatively easy in the region of the reduced cross section thereof. While it has already been suggested to form these guard fingers from elastic plastic material, the form of the steel fingers has been maintained and such fingers of plastic material have not worked out satisfactorily in practice due to the large amount of material required and due to excessive flexibility of such fingers.

It is an object of the present invention to provide for guard fingers of the aforementioned type which are formed from plastic material, preferably thermoplastic material, which have all the advantages of the steel fingers, as far as rigidity thereof is concerned, without having the above mentioned disadvantages thereof.

It is a further object of the present invention to provide guard fingers made from plastic material which are light in weight but have the necessary rigidity to withstand the forces they are subjected to during use and which in addition can be easily attached to a carrier bar.

It is an additional object of the present invention to provide for a guard finger of the aforementioned type which is formed of plastic material in such a manner that it can be easily manufactured at very reasonable cost and so that the finger will stand up during extended use.

SUMMARY OF THE INVENTION

With this object in view, the guard finger according to the present invention for a mowing apparatus, such as a harvester combine or the like, is made from plastic material and has a rear portion adapted to be releasably attached to a carrier brand front portion integral with the rear portion. The finger tapers from the rear to the front portion and the rear portion is in the form of a hollow, bending and torsion resistant profile and provided with engaging means for positioning a blade thereon.

The front portion of the finger has preferably in a cross-section transverse to the longitudinal axis of the finger a cross-like configuration and the front portion preferably tapers substantially to a point at the front end thereof. The hollow profile is preferably made of substantially triangular configuration having an upper wall with an upper substantially flat surface provided with the aforementioned engaging means and a stationary steel blade is mounted on the flat surface of the hollow profile and has complementary engaging means cooperating with the engaging means on the profile for locating the blade on the aforementioned flat surface. The blade is fastened by fastening means such as a rivet or the like onto the flat surface of the hollow profile.

The carrier bar is preferably in form of an angle bar having a first bar portion abutting against part of the upper wall of the hollow profile and a second bar portion, substantially normal to the first bar portion, against which the rear end of the finger abuts. The upper wall of the hollow profile is preferably provided with a longitudinal extending slot extending forwardly from the rear end of the finger. An attaching bolt extends through the slot and a corresponding bore in the first bar portion, and a nut screwed on a portion of the bolt projecting beyond the first bar portion serve to fasten the finger to the carrier bar. The upper wall is preferably provided with a transverse ridge engaged in a corresponding groove in the first bar portion, and a metal plate is preferably sandwiched between the head of the attaching bolt and a bottom face portion of the upper wall of the triangular hollow rear portion of the finger.

The finger includes also a cover portion integral with the front portion and extending rearwardly over the steel blade, upwardly spaced therefrom, and this cover portion is preferably of substantially T-shaped configuration forming a central rib facing away from the steel blade.

Preferably each finger includes also a pair of spacer members integral with the rear portion of the finger and respectively projecting to opposite sides thereof for spacing one finger from corresponding fingers adjacent thereto. The outer end of at least one spacer member of one finger may be formed integral with the outer end of the spacer member of a finger adjacent thereto so that two adjacent fingers are connected to each other to form an integral unit.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 3 is a perspective view of two adjacent fingers according to the present invention;

FIG. 4 is a cross section taken along the line IV—IV of FIG. 1;

FIG. 5 is a cross section taken along the line V—V of FIG. 1;

FIG. 6 is a cross section taken along the line VI—VI of FIG. 1; and

Figure 1:
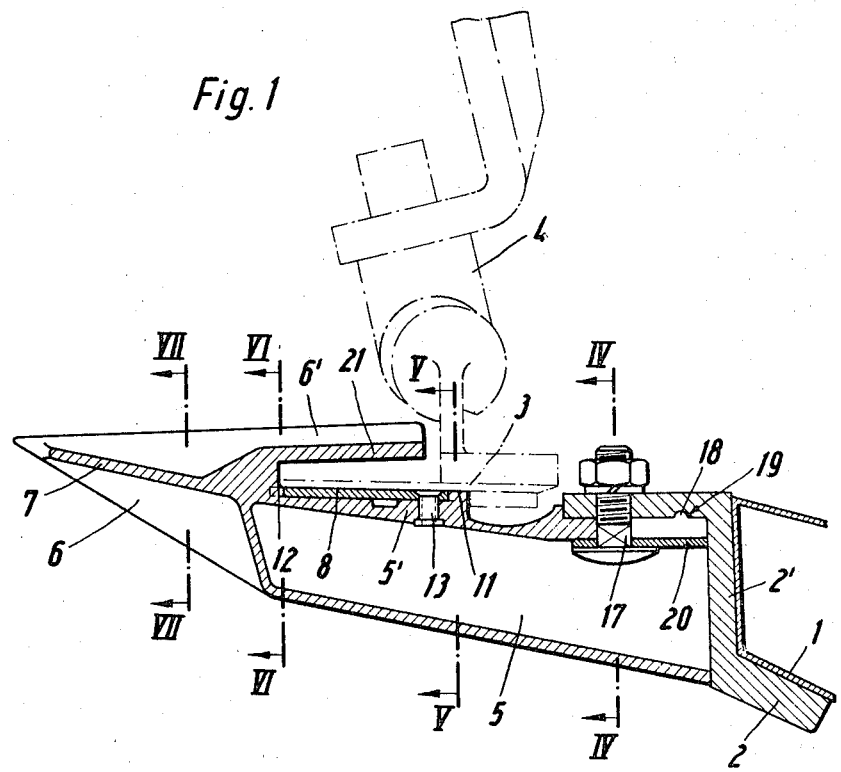
FIG. 1 is an axial cross section through a guard finger according to the present invention and showing the guard finger attached to a carrier bar.

IFG. 7 is a cross section taken along the line VII—VII of FIG. 1.

DESCRIPTION OF THE PREFERRED EMBODIMENT

FIG. 1 partially illustrates the cutter platform 1 of a mowing apparatus of known construction which carries at the front end thereof a carrier bar 2 of preferably substantially Z-shaped configuration to which a plurality of guard fingers according to the present invention all attached, in the manner as will be described later on in detail, projecting laterally spaced from each other forwardly from the carrier bra 2. FIG. 1 also schematically illustates in dash-dot lines a reciprocable cutter 3 and a mechanism 4 of known construction for reciprocating the cutter bar in direction transverse to the longitudinal direction of the guard fingers. The reciprocating cutter 3 and the mechanism for reciprocating the cutter do not form part of the present invention and are, therefore, not described in detail.

Figure 2:
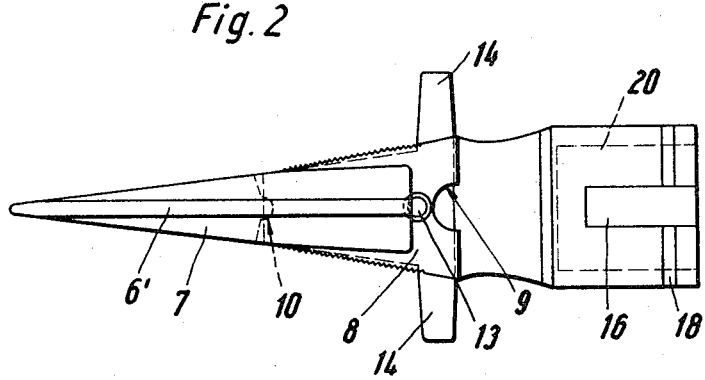
FIG. 2 is a top view of the finger as shown in FIG. 1.

The guard fingers according to the present invention are formed from plastic material and each has a rear portion 5 adapted to be releasably attached to the carrier bar 2 and a front portion integral with the rear portion. As best shown in FIG. 2 the finger tapers from the rear to the front portion, dna the rear portion 5, which is subjected during use of the fingers to the greatest stress, is formed as a hollow profile which has, as best shown in FIGS. 4–6, preferably a substantially triangular configuration. The front portion of the finger which is integral with the rear portion is substantially cross shaped, as best shown in FIG. 7, and has a vertically extending rib 6, 6' and a transverse rib 7 crossing the vertical rib intermediate the ends thereof. The two ribs taper substantially to a point at the front end of the finger. The upper horizontal wall 5' of the hollow profile of the rear portion of the finger carries a steel blade 8 which abuts against the substantially flat top surface of the top wall 5'. The blades 8 on the guard fingers cooperate with the fingers of the reciprocating cutter 3 in a known manner to cut, during reciprocation of the cutter 3, stalks which are guided by the guard fingers against the cutting edges of the fingers of the reciprocating cutter 3. The blade 8 is provided at the rear and front edges thereof with substantially semicircular cut-outs 9 and 10 in which corresponding projections 11 and 12 integral with the upper wall 5' engage to properly locate the blade 8 on the upper wall 5'. The projections 11 and 12 form therefore engaging means cooperating with complementary engaging means, that is the cut-outs 9 and 10 for properly locating the blade 8 on the upper wall 5' of the rear portion of the finger. A rivet 13, extending through appropriate bores in the blade 8 and the upper wall 5' forms fastening means for fastening the blade 8 to the upper wall 5'.

Each of the fingers includes also a pair of spacer members 14 integral wtih the rear portion of the finger and respectively projecting to opposite sides thereof for spacing one finger from corresponding fingers adjacent thereto. The spacer members 14 are preferably of substantially cylindrical configuration and each formed with a central bore extending from the free end of the spacer member into the latter and adapted to receive a connecting pin, not shown in th drawing, for connecting spacer members on adjacent fingers to each other. Preferably, the cylindrical spacer members 14 are reinforced at the inner ends thereof by triangular ribs 15, as best shown in FIG. 5.

In order to attach the fingers respectively to carrier bar 2, the upper wall 5' of the rear portion 5 of each finger is provided with a central slot 16 extending from the rear end of the upper wall into the latter, and an attaching bolt 17 extends through the slot 16 and a corresponding bore in the horizontal bar portion of the carrier bar 2 which abuts against the rear portion of the upper wall 5' of the finger. The upper wall 5' is also provided in the region of the rear end thereof with a transverse ridge 18 which engages in a corresponding groove 19 in the horizontal bar portion, when a nut screwed onto the upper threaded end of the attaching bolt 17 is tightened to press the upper wall 5' of the finger against the horizontal portion of the carrier bar 2. A metal plate 20 is preferably sandwiched between the head of the bolt 17 and a bottom face portion of the upper wall 5' of the finger, and the bolt 17 has adjacent its head a portion of substantially square cross section extending through a corresponding opening in the plate 20 so that the bolt is secured against turning with respect to the plate 20. The area of the plate 20 which abuts against the bottom face of the upper wall 5' is chosen in such a manner that the pressure produced by tightening the bolt 17 is transmitted to an area of the upper wall 5' greater than the area of the head of the bolt so that cold flow of the plastic material of the upper wall portion 5' is substantially reduced and loosening of the tightened bolt 17 is prevented.

The rear edge of the hollow profile 5 is located in one plane and abuts against the vertical portion 2' of the carrier bar which closes the rear end of the hollow profile and which thus reduces the stress on the top wall 5' in the region of its connection to the horizontal portion of the bar 2.

The above described connection of each of the fingers permits an easy attachment and removal of the respectivetive finger from the carrier bar without removing the attaching bolt from the latter, since the finger may be released from the attaching bolt when the nut is tunred sufficiently to permit disengagement of the transverse ridge 18 from the corresponding groove 19, whereupon the finger may be removed in forward direction from the carrier bar.

Each finger preferably includes a cover portion integral with the front portion and extending therefrom rearwardly over the steel blade 8 upwardly spaced therefrom. The cover portion is preferably of T-shaped configuration, as best shown in FIG. 6, having a transverse rib 21 and a central rib 6' forming a rear extension of the vertical rib of the front portion of the finger. The cover portion may be used to attach a grain lifter thereto, not shown in the drawing, for which purpose the profile 5 may also be provided with additional projections or depressions. If necessary, the hollow profile may be additionally reinforced by ribs or the like, not shown in the drawing.

As shown in FIG. 3 spacer members 14 of adjacent fingers may also be connected to each other so that two adjacent fingers form an integral unit.

It will be understood that each of the elements described above, or two or more together, may also find a useful application in other types of guard fingers for mowing apparatus in which the guard fingers are made from plastic material differing from the types described above.

While the invention has been illustrated and described as embodied in a guard finger of plastic material having a rear portion in form of a hollow bending and torsion resisting profile, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims:

1. A unitary guard finger for a mowing apparatus, said guard finger being made of plastic material and having a rear portion adapted to be releasably attached to a carrier bar and a front portion integral with said rear portion, said finger tapering from said rear to said front portion and said rear portion being in the form of a hollow circumferentially closed, bending- and torsion-resistant profile and provided with engaging means for positively locating a blade thereon, said front portion having in a cross section transverse to the longitudinal axis of said finger a cross-like configuration tapering substantially to a point.

2. A guard finger as defined in claim 1 wherein said hollow profile is of substantially triangular configuration.

3. A guard finger as defined in claim 2, wherein said hollow triangular profile has an upper wall having an upper substantially flat surface provided with said engaging means, and including a stationary steel blade on said flat surface and having complementary engaging means cooperating with said engaging means on said profile for locating said blade on said flat surface, and means for fastening said blade on said flat surface.

4. A guard finger as defined in claim 3, wherein said engaging means on said profile are constituted by a pair of spaced projections and said complementary engaging means are constituted by cut-outs in said blade in which said projections are engaged.

5. A guard finger as defined in claim 3, wherein said carrier bar is an angle bar having a first portion abutting against part of said upper wall and a second bar portion substantially normal to said first bar portion against which the rear end of the rear portion abuts, said upper wall portion being provided with a longitudinally extending slot extending forwardly from said rear end of said finger, and including an attaching bolt extending through said slot and a corresponding bore in said first bar portion, and a nut screwed onto a portion of the bolt projecting beyond said first bar portion.

6. A guard finger as defined in claim 5, wherein said upper wall is provided with a transverse ridge engaged in a corresponding transverse groove in said first bar portion.

7. A guard finger as defined in claim 5, wherein said attaching bolt has a head on one end thereof and including a metal plate sandwiched between said head and a bottom face portion of the upper wall.

8. A guard finger as defined in claim 3, and including a cover portion integral with said front portion and extending therefrom rearwardly over said steel blade upwardly spaced therefrom.

9. A guard finger as defined in claim 8, wherein said cover portion is of substantially T-shaped configuration forming a central rib facing away from said steel blade.

10. A guard finger as defined in claim 1 and including a pair of spacer members integral with said rear portion of said finger and respectively projecting to opposite sides therefrom for spacing the finger from corresponding fingers adjacent thereto.

11. A guard finger as defined in claim 10, wherein said spacer members are substantially cylindrical and formed with a central bore extending from the free end of the respective spacer member into the latter for receiving a connecting pin connecting spacer members on adjacent fingers to each other.

12. A guard finger as defined in claim 10, wherein the outer end of at least one spacer member is integral with the outer end of a spacer member of a finger adjacent thereto so that two adjacent fingers form an integral unit.

References Cited

UNITED STATES PATENTS

| | | | |
|---|---|---|---|
| 770,892 | 9/1904 | Crates | 56—310 |
| 782,296 | 2/1905 | Webber | 56—310 |
| 1,306,686 | 6/1919 | Crawford | 56—311 |
| 1,374,973 | 4/1921 | Witte | 56—308 |
| 1,755,534 | 9/1928 | Borkhuis | 56—311 |
| 1,869,898 | 8/1932 | Jenson | 56—311 |
| 2,127,048 | 8/1938 | Powell | 56—307 |
| 2,761,269 | 9/1956 | Krause et al. | 56—307 |
| 2,882,671 | 4/1959 | Naery | 56—307 |
| 3,212,249 | 10/1965 | Boyer | 56—311 |

FOREIGN PATENTS 529,002  11/1940  Great Britain.

RUSSELL R. KINSEY, Primary Examiner

J. A. OLIFF, Assistant Examiner